US010433087B2

(12) United States Patent
Bernal Castillo et al.

(10) Patent No.: US 10,433,087 B2
(45) Date of Patent: Oct. 1, 2019

(54) SYSTEMS AND METHODS FOR REDUCING VIBRATION NOISE

(71) Applicant: QUALCOMM Incorporated, San Diego, CA (US)

(72) Inventors: Ricardo De Jesus Bernal Castillo, San Diego, CA (US); Daniel Weber, Escondido, CA (US); Dipanjan Sen, San Diego, CA (US); Eric Mattis, San Diego, CA (US); Mark Cherry, Oceanside, CA (US); Nils Günther Peters, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 98 days.

(21) Appl. No.: 15/266,776

(22) Filed: Sep. 15, 2016

(65) Prior Publication Data
US 2018/0077507 A1   Mar. 15, 2018

(51) Int. Cl.
*H04R 29/00* (2006.01)
*H04R 3/04* (2006.01)
(Continued)

(52) U.S. Cl.
CPC .......... *H04R 29/005* (2013.01); *G01H 17/00* (2013.01); *H04R 3/00* (2013.01); *H04R 3/04* (2013.01); *G01P 15/097* (2013.01); *G01P 15/125* (2013.01); *H04R 1/406* (2013.01); *H04R 29/004* (2013.01); *H04R 2201/401* (2013.01); *H04R 2410/05* (2013.01); *H04R 2430/03* (2013.01)

(58) Field of Classification Search
CPC .. H04R 29/005; H04R 3/04; H04R 2201/401; H04R 2430/03; G10H 17/00; G01P 15/097; G01P 15/125
See application file for complete search history.

(56) References Cited

U.S. PATENT DOCUMENTS

| 5,701,349 A | 12/1997 | Sano et al. |
| 7,775,964 B2 * | 8/2010 | Miller, III ............ H04R 25/606 600/25 |

(Continued)

FOREIGN PATENT DOCUMENTS

| WO | 2008067396 A2 | 6/2008 |
| WO | 2012025794 A1 | 3/2012 |

(Continued)

OTHER PUBLICATIONS

International Search Report and Written Opinion—PCT/US2017/046148—ISA/EPO—dated Nov. 2, 2017.

*Primary Examiner* — Davetta W Goins
*Assistant Examiner* — Kuassi A Ganmavo
(74) *Attorney, Agent, or Firm* — Austin Rapp & Hardman, P.C.

(57) ABSTRACT

A method for reducing vibration noise by an electronic device is described. The method includes obtaining an audio signal. The audio signal includes vibration noise. The method also includes obtaining vibration data from one or more motion sensor signals. The method further includes processing the vibration data to produce microphone-response matched vibration data based on a transfer function. The method additionally includes reducing the vibration noise based on the microphone-response matched vibration data.

26 Claims, 15 Drawing Sheets

(51) Int. Cl.
  *G01H 17/00* (2006.01)
  *H04R 3/00* (2006.01)
  *H04R 1/40* (2006.01)
  G01P 15/097 (2006.01)
  G01P 15/125 (2006.01)

(56) References Cited

U.S. PATENT DOCUMENTS

| | | | |
|---|---|---|---|
| 9,305,567 B2 | 4/2016 | Visser et al. | |
| 2003/0147539 A1* | 8/2003 | Elko | H04R 3/005 381/92 |
| 2003/0179888 A1 | 9/2003 | Burnett et al. | |
| 2005/0063553 A1* | 3/2005 | Ozawa | H04R 3/005 381/92 |
| 2006/0155346 A1* | 7/2006 | Miller, III | H04R 25/606 607/57 |
| 2009/0032630 A1* | 2/2009 | Svedberg | B02C 7/14 241/259.1 |
| 2009/0287485 A1* | 11/2009 | Glebe | G10L 21/0208 704/233 |
| 2010/0110857 A1* | 5/2010 | McElfresh | G11B 5/455 369/53.43 |
| 2010/0214216 A1* | 8/2010 | Nasiri | A63F 13/06 345/158 |
| 2011/0319703 A1* | 12/2011 | Wiskerke | H04R 25/30 600/25 |
| 2012/0059648 A1* | 3/2012 | Burnett | H04R 1/46 704/226 |
| 2012/0087513 A1* | 4/2012 | Takatani | H04R 1/406 381/92 |
| 2012/0224723 A1* | 9/2012 | Akino | H04R 3/04 381/114 |
| 2013/0147835 A1* | 6/2013 | Lee | H04R 3/005 345/629 |
| 2013/0270657 A1* | 10/2013 | Acar | G01C 19/5755 257/415 |
| 2014/0133647 A1 | 5/2014 | Michaelis et al. | |
| 2014/0270275 A1* | 9/2014 | Niedzwiedz | H04R 3/002 381/190 |
| 2016/0165357 A1* | 6/2016 | Morishita | H04R 19/005 381/170 |

FOREIGN PATENT DOCUMENTS

| | | |
|---|---|---|
| WO | 2015142893 A1 | 9/2015 |
| WO | 2016061076 A1 | 4/2016 |

* cited by examiner

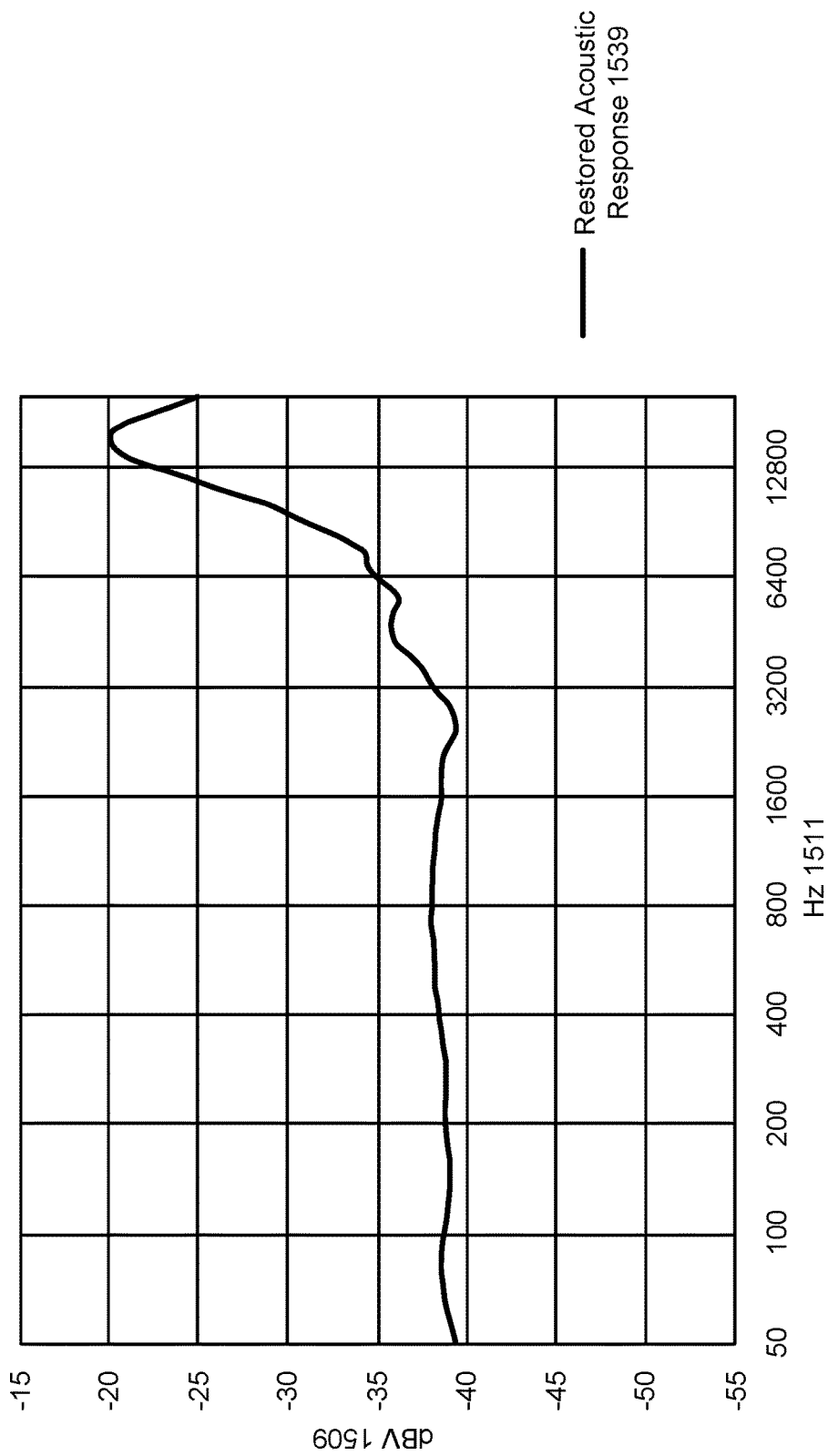

US 10,433,087 B2

SYSTEMS AND METHODS FOR REDUCING VIBRATION NOISE

FIELD OF DISCLOSURE

The present disclosure relates generally to electronic devices. More specifically, the present disclosure relates to systems and methods for reducing vibration noise.

BACKGROUND

Some electronic devices (e.g., cameras, smartphones, audio recorders, computers, laptop computers, tablet devices, game consoles, televisions, automobiles, appliances, set-top boxes, etc.) capture and/or utilize audio signals. For example, a smartphone may capture one or more audio signals for a phone call or for a recording.

Electronic devices may be utilized in a variety of ways, situations, and/or environments. For example, some electronic devices may be utilized in contexts where captured audio may become corrupted with noise.

Depending on the nature of the context in which an electronic device is utilized, it may be difficult to detect and/or reduce noise. As can be observed from this discussion, systems and methods that improve signal processing may be beneficial.

SUMMARY

A method for reducing vibration noise by an electronic device is described. The method includes obtaining an audio signal. The audio signal includes vibration noise. The method also includes obtaining vibration data from one or more motion sensor signals. The method further includes processing the vibration data to produce microphone-response matched vibration data based on a transfer function. The method additionally includes reducing the vibration noise based on the microphone-response matched vibration data. The vibration noise may be reduced in an electronic domain. The method may include adjusting a physical disposition of one or more microphones based on the vibration data.

The transfer function may indicate a mechanical vibration response relationship between a motion sensor and one or more microphones. The transfer function may vary over frequency. The transfer function may be calibrated to match a motion sensor vibration response to a vibration response of one or more microphones.

A motion sensor that produces the one or more motion sensor signals may be alignment independent from a microphone that produces the audio signal. A motion sensor that produces the one or more motion sensor signals may be used for multiple microphones.

The electronic device may include a microphone array. The microphone array may be a spherical microphone array that is mechanically coupled to a motion sensor that produces the one or more motion sensor signals.

An electronic device for reducing vibration noise is also described. The electronic device includes a processor. The processor is configured to obtain an audio signal. The audio signal includes vibration noise. The processor is also configured to obtain vibration data from one or more motion sensor signals. The processor is further configured to process the vibration data to produce microphone-response matched vibration data based on a transfer function. The processor is additionally configured to reduce the vibration noise based on the microphone-response matched vibration data.

An apparatus for reducing vibration noise is also described. The apparatus includes means for obtaining an audio signal. The audio signal includes vibration noise. The apparatus also includes means for obtaining vibration data from one or more motion signals. The apparatus further includes means for processing the vibration data to produce audio sensing means-response matched vibration data based on a transfer function. The apparatus additionally includes means for reducing the vibration noise based on the audio sensing means-response matched vibration data.

A computer-program product for reducing vibration noise is also described. The computer-program product includes a non-transitory computer-readable medium with instructions. The instructions include code for causing an electronic device to obtain an audio signal. The audio signal includes vibration noise. The instructions also include code for causing the electronic device to obtain vibration data from one or more motion sensor signals. The instructions further include code for causing the electronic device to process the vibration data to produce microphone-response matched vibration data based on a transfer function. The instructions additionally include code for causing the electronic device to reduce the vibration noise based on the microphone-response matched vibration data.

BRIEF DESCRIPTION OF THE DRAWINGS

FIG. 15 is a graph illustrating an example of a restored acoustic response.

DETAILED DESCRIPTION

Some configurations of the systems and methods disclosed herein may relate to reducing vibration noise (e.g., vibration noise cancellation). For example, when a microphone is under vibration, the microphone membrane may vibrate, producing a voltage signal at the output of the microphone. This vibration noise interferes with the audio signal and reduces the signal-to-noise ratio (SNR) of the audio signal. In particular, vibration noise is a problem for action video cameras, where the user attaches the video/audio rescoring device to himself or to sports equipment (e.g., a bicycle, surf board, helmet, backpack, etc.).

In some examples of the systems and methods disclosed herein, vibration data (e.g., acceleration and rotational data) may be measured by a 6-axis motion sensor. For example, a motion sensor (e.g., 6-axis motion sensor) may be utilized to measure vibration at one or more microphones. The vibration data may be used to calculate the amount of noise introduced in the microphone system due to vibration. Using this data, the vibration noise may be reduced (e.g., extracted, cancelled, etc.) from the microphone signal to improve SNR. Since the microphone and the 6-axis motion sensor have different responses to vibration, the vibration data from the 6-axis sensor may be processed to match the microphone response to vibration.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
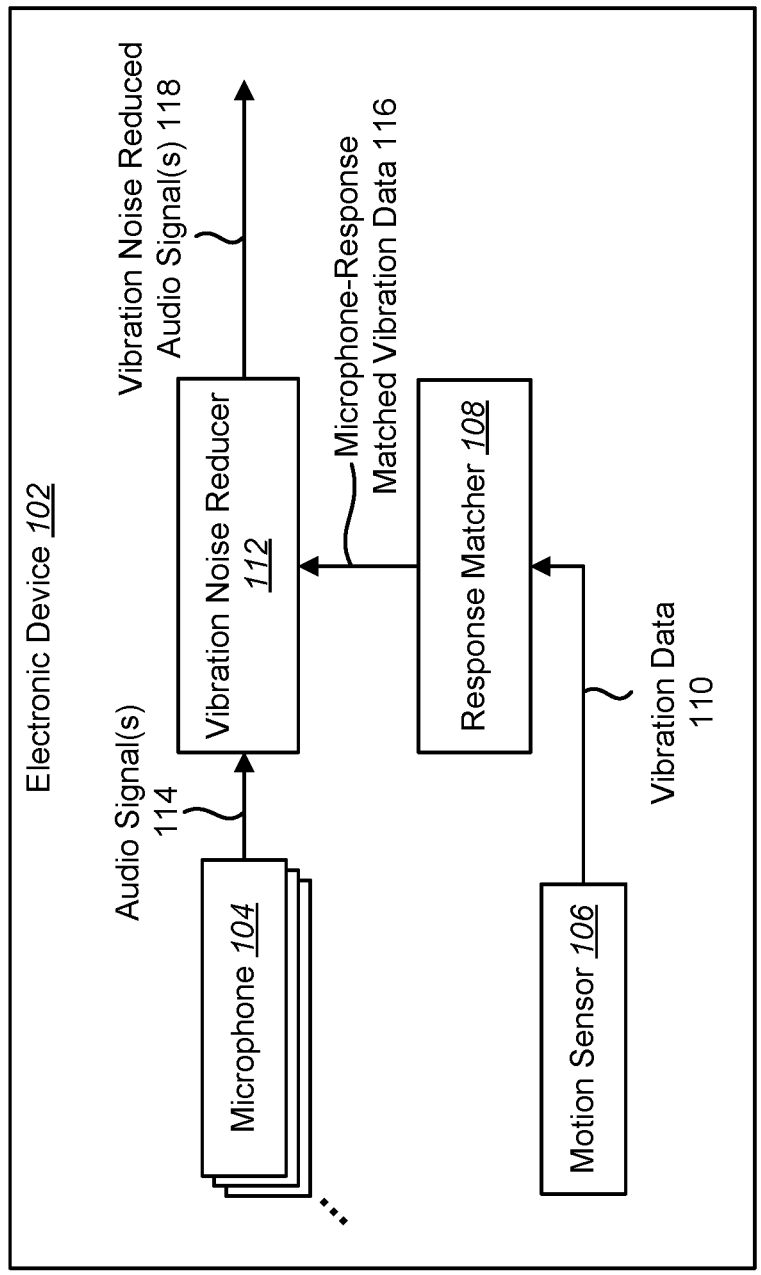
FIG. 1 is a block diagram illustrating one example of an electronic device in which systems and methods for reducing vibration noise may be implemented.

FIG. 1 is a block diagram illustrating one example of an electronic device 102 in which systems and methods for reducing vibration noise may be implemented. Examples of the electronic device 102 include computers (e.g., desktop computers, laptop computers, etc.), cellular phones, smartphones, tablet devices, audio recorders, media players, televisions, vehicles, cameras (e.g., action cameras, body-mounted cameras, drop cameras, mounted cameras, video recorders, etc.), virtual reality devices (e.g., headsets), augmented reality devices (e.g., headsets), mixed reality devices (e.g., headsets), gaming consoles, personal digital assistants (PDAs), set-top boxes, appliances, etc. The electronic device 102 may include one or more components or elements. One or more of the components or elements may be implemented in hardware (e.g., circuitry) or a combination of hardware and software and/or firmware (e.g., a processor with instructions).

The electronic device 102 may include one or more microphones 104, a motion sensor 106, a response matcher 108, and/or a vibration noise reducer 112. Each microphone 104 may be a transducer that converts acoustic signals into electrical or electronic audio signals. Examples of the microphone(s) 104 may include microelectromechanical system (MEMS) microphone(s), omnidirectional microphone(s), bidirectional microphone(s), unidirectional microphone(s), cardioid microphone(s), piezoelectric microphone(s), dynamic microphone(s), electret microphone(s), condenser microphones, etc. In some configurations, multiple microphones 104 may be a microphone array. For example, multiple microphones 104 may be arranged in a linear array, a circular array, a spherical array, orthogonal pair array, etc. In some examples, many microphones may be utilized in a microphone array. For instance, a 32-microphone spherical array may be implemented and/or utilized in some configurations.

The one or more microphones 104 may obtain (e.g., capture) one or more respective audio signals 114. For example, the microphone(s) 104 may capture acoustical audio signals as electronic audio signal(s) 114. The audio signal(s) 114 may include vibration noise. For example, the microphone(s) 104 (e.g., electronic device 102) may be in motion, may be subject to mechanical vibration, and/or may be subject to mechanical shock. For instance, the electronic device 102 may be an action camera mounted on the helmet of a bike rider. As the bike traverses terrain, the action camera may experience mechanical vibration and/or shock. The microphone(s) 104 may capture vibration noise due to the vibration. For example, the diaphragm of each microphone 104 may respond to the mechanical vibration, which may corrupt the audio signal(s) 114. In some configurations, the audio signal(s) 114 (during runtime, for instance) may be denoted MT, which may include the acoustic component (e.g., an electronic audio component from acoustic sound) and the vibration noise component. The audio signal(s) 114 may be provided to the vibration noise reducer 112. In some configurations, a direct current (DC) offset may be determined and/or removed from the audio signal(s) 114 and/or from the vibration data 110. In some configurations, the electronic device 102 may transform one or more of the audio signals 114 into the frequency domain. For example, a fast Fourier transform (FFT) may be performed on the one or more audio signals 114.

The motion sensor 106 may be a device that detects (e.g., measures) motion. For instance, the motion sensor 106 may detect translational motion along one or more axes and/or may detect rotational motion around one or more axes. Examples of the motion sensor 106 may include gyros, accelerometers, etc. The motion sensor 106 may produce one or more motion signals (e.g., motion sensor signals). The motion signal(s) may indicate vibration data 110. Accordingly, the motion sensor 106 may obtain (e.g., sense, detect, etc.) vibration data 110. The vibration data 110 may indicate vibration (e.g., translational vibration and/or rotational vibration) in one or more dimensions. For example, a 6-axis motion sensor may produce translational vibration data 110 along three axes (e.g., x, y, z) and rotational vibration data 110 around three axes. In some configurations, the vibration data 110 may be denoted $AV_{(x,y,z)}$. The vibration data 110 may be provided to the response matcher 108. In some configurations, the electronic device 102 may transform the vibration data 110 into the frequency domain. For example, an FFT may be performed on the vibration data 110.

The response matcher 108 may process the vibration data 110 to produce microphone-response matched vibration data 116. Producing the microphone-response matched vibration data 116 may be based on a transfer function. For example, the transfer function may indicate a mechanical vibration relationship between the motion sensor 106 and the one or more microphones 104.

In particular, the motion sensor 106 may be mechanically coupled to the one or more microphones 104. For example, the motion sensor 106 may be included in the same housing as the one or more microphones 104 (e.g., in an electronic device 102 housing) and/or may otherwise be coupled to the microphone(s) 104. Due to the mechanical coupling, the motion sensor 106 may experience similar movement, vibration, and/or shock as the microphone(s) 104. The motion sensor 106 response to the movement, vibration, and/or shock may be different from the microphone(s) 104 response(s) to the movement, vibration, and/or shock.

In configurations where there are multiple microphones 104, the motion sensor 106 may have a different response relationship (e.g., mechanical vibration response relationship, transfer factor, etc.) with respect to each microphone 104. For example, each microphone 104 may be mounted at different angles and/or in different locations in the electronic device 102. Accordingly, the vibration data 110 obtained by the motion sensor 106 may relate differently to the vibration noise in each of the audio signal(s) 114. The motion sensor 106 may be alignment independent of the one or more microphones 104. For example, the motion sensor 106 may not need to be mounted in any particular alignment relationship with the microphone(s) 104. For instance, the systems and methods disclosed herein may not require that the motion sensor 106 be aligned with any particular microphone 104 to reduce vibration noise. This may allow the motion sensor 106 to be manufactured separately from the microphone(s) 104, which may reduce costs.

The transfer function (e.g., one or more transfer factors) may indicate the relationship between the response of the motion sensor 106 and the response(s) of the one or more microphones 104. The transfer function may vary over frequency in some approaches. In some configurations, only a single motion sensor 106 (e.g., vibration data 110 from a single motion sensor 106) may be utilized for all of the multiple microphones 104. For example, the vibration data 110 from a single motion sensor 106 (for one or more axes, for instance) may be utilized to reduce vibration noise in all of the audio signal(s) 114. A separate motion sensor 106 may not be needed for each separate microphone 104. This may reduce manufacturing costs, since only one motion sensor 106 (e.g., not multiple motion sensors) may be utilized.

In some configurations, the electronic device 102 (e.g., response matcher 108, transfer function, etc.) may be calibrated to match the motion sensor 106 vibration response to a vibration response of the one or more microphones 104. During calibration, for example, the electronic device 102 (e.g., the microphone(s) 104 and the motion sensor 106) may be subjected to one or more movements (e.g., vibrations, shocks, etc.). Calibration vibration data (e.g., $AV_{(x,y,z)}$) may be obtained from the motion sensor 106 and one or more calibration audio signals (e.g., $MV_{(x,y,z)}$) may be obtained from the microphone(s) 104. The electronic device 102 (or a separate calibration device, for example) may determine the transfer function between the motion sensor 106 response and the microphone(s) 104 response(s). For example, the calibration vibration data may be matched with the calibration audio signal(s) to produce the transfer function (e.g., one or more transfer factors). The transfer function may indicate an adjustment to be performed to match the vibration data 110 with the one or more audio signals 114.

In some configurations, the transfer function may be represented with one or more transfer factors (e.g., K). Each of the transfer factors may respectively correspond to each microphone 104. In some approaches, each transfer factor may be determined by subtracting the calibration vibration data (e.g., $AV_{(x,y,z)}$) from each of the calibration audio signals (e.g., $MV_{(x,y,z)}$) corresponding to each of the microphones 104.

The response matcher 108 may match the response of the motion sensor 106 to the response of each of the one or more microphones 104 to produce microphone-response matched vibration data 116. For example, the response matcher 108 may use the transfer function to adjust (e.g., filter, delay, scale, transform, etc.) the vibration data 110 to match the vibration noise in each of the audio signals 114.

In some configurations, the response matcher 108 may apply one or more transfer factors (e.g., K) to the runtime vibration data 110 (e.g., $AV_{(x,y,z)}$) in order to obtain the runtime microphone-response matched vibration data 116. For example, the transfer factor(s) may be added to the runtime vibration data 110 to determine a microphone response (e.g., $MV_{(x,y,z)}$). In some approaches, the microphone response (e.g., $MV_{(x,y,z)}$) may be an example of microphone-response matched vibration data 116. Alternatively, the vibration levels corresponding to different axes may be added (by the response matcher 108, for example) to obtain the microphone-response matched vibration data 116 (e.g., $MV_t$). The microphone-response matched vibration data 116 may be provided to the vibration noise reducer 112.

The vibration noise reducer 112 may reduce the vibration noise in the one or more audio signals 114 based on the microphone-response matched vibration data 116. In some approaches, the vibration noise reducer 112 may subtract the microphone-response matched vibration data 116 from the audio signal(s) 114 (e.g., $MT-MV_t=MA$). Additionally or alternatively, the vibration noise reducer 112 may filter the audio signal(s) 114 based on the microphone-response matched vibration data 116. The vibration noise reducer 112 may accordingly reduce (e.g., lessen, cancel, eliminate, etc.) the vibration noise in the audio signal(s) 114. The vibration noise reducer 112 may produce one or more vibration noise reduced audio signals 118. In some configurations, the vibration noise may be reduced in the electronic domain. For example, the vibration noise may be removed from an electronic signal (and may not be cancelled in an acoustic domain, for instance). In some configurations, the vibration noise reduced audio signal(s) 118 may be converted to the time domain. For example, an inverse fast Fourier transform (IFFT) may be performed on the vibration noise reduced audio signal(s) 118. The vibration noise reduced audio signal(s) 118 may be stored, transmitted, and/or output (with a speaker, for example), etc.

Some configurations of the systems and methods disclosed herein may be implemented in accordance with the following. $MV_{(x,y,z)}$ is a microphone vibration response per axis (for the x axis, y axis, and z axis, for example). $MV_{(x,y,z)}$ may be measured during calibration or design. $MV_{(x,y,z)}$ may have one value per axis. $MV_t$ is a total microphone vibration response (e.g., mechanical vibration). $MV_t$ may be a sum of vibration responses for the three axes. MA is a microphone acoustic (e.g., audio) response. For example, MA may represent a microphone response to sound. MA may be measured during calibration and/or may be taken from a microphone datasheet, for instance. During runtime, MA may represent the vibration noise reduced audio signal (e.g., the microphone response without vibration noise). MT is a total microphone response (e.g., a total acoustic and vibration response). For example, MT may be a sum of the acoustic response and vibration response (e.g., vibration noise). $AV_{(x,y,z)}$ is a motion sensor (e.g., accelerometer) vibration response. $AV_{(x,y,z)}$ may be measured during calibration and/or design, and/or may be taken from a motion sensor datasheet. During runtime, $AV_{(x,y,z)}$ may represent the vibration data 110. $K_{(x,y,z)}$ is a transfer factor. $K_{(x,y,z)}$ may be calculated by subtracting the motion sensor (e.g., accelerometer) vibration response ($AV_{(x,y,z)}$) from the microphone vibration response ($MV_{(x,y,z)}$). $K_{(x,y,z)}$ may be measured during calibration and/or design. Each microphone 104 may have a corresponding transfer factor $K_{(x,y,z)}$ (e.g., a set of values of a transfer factor). During runtime, $K_{(x,y,z)}$ may be utilized to obtain the microphone-response matched vibration data 116.

One or more of the following Equations may be utilized to reduce vibration noise captured by the one or more microphones 104 (e.g., to subtract vibration noise from the microphone output). Equation (1) may represent a microphone 104 output (e.g., a total microphone response).

$$MA+MV=MT \quad (1)$$

The transfer factor may be determined (e.g., calculated) during calibration or design in accordance with Equation (2).

$$MV_{(x,y,z)}-AV_{(x,y,z)}=K_{(x,y,z)} \quad (2)$$

The microphone vibration response (per axis, for example) may be calculated by adding the motion sensor (e.g., accelerometer) output or response to the transfer factor in accordance with Equation (3). This may be calculated at runtime in some configurations.

$$AV_{(x,y,z)}+K_{(x,y,z)}=MV_{(x,y,z)} \quad (3)$$

As described above, the transfer function (e.g., H(s)) may be represented with one or more transfer factors. For example, using or applying a transfer function may be performed by adding one or more transfer factors to vibration data 110 in accordance with Equation (3). Each transfer factor (K) may be unique to each microphone model and/or position. Accordingly, each transfer factor may be used to extract vibration information from each microphone. In some configurations, using or applying a transfer function may be equivalent to calculating $$AV_{(x,y,z)}+K_{(x,y,z)}=MV_{(x,y,z)}$$

The total microphone vibration response may be calculated in accordance with Equation (4) by adding the vibration levels from the three axes. $MV_t$ may be one example of the microphone-response matched vibration data 116.

$$MV_x+MV_y+MV_z=MV_t \quad (4)$$

The microphone acoustic response (e.g., the vibration noise reduced audio signal(s) 118) may be calculated in accordance with Equation (5) by subtracting the total microphone vibration response from the total microphone response. For instance, the calculated total microphone vibration response may be subtracted from the microphone output.

$$MT-MV_t=MA \quad (5)$$

In some configurations, the electronic device 102 may adjust a physical disposition of the one or more microphones 104 based on the vibration data 110. For example, if the vibration data 110 indicates higher amplitude vibration in a particular direction, the electronic device 102 may move (e.g., rotate, adjust, etc.) one or more of the microphone(s) 104 such that the microphone diaphragm(s) are approximately perpendicular to the direction of higher amplitude vibration. This may lessen the amount of vibration noise captured by the microphone(s) 104.

It should be noted that in some configurations, the microphone(s) 104 and motion sensor 106 may not be included within the electronic device 102 and/or may be remote from the electronic device 102. For example, the microphone(s) 104 and motion sensor 106 may be mounted in a microphone housing that communicates with the electronic device 102. Additionally or alternatively, the electronic device 102 may be a computing device (e.g., web server) that receives the audio signal(s) 114 and vibration data 110 from a remote device and performs vibration noise reduction.

The vibration noise reducer 112 and/or the response matcher 108 may be implemented in a variety of ways. For example, the response matcher 108 and/or the vibration noise reducer 112 may be implemented in hardware (e.g., circuitry, as one or more application specific integrated circuits (ASICs), etc.) or in a combination of hardware and software (e.g., in a processor with instructions in memory).

In some configurations, the electronic device 102 may perform one or more of the functions, procedures, methods, steps, etc., described in connection with one or more of FIGS. 2-10. Additionally or alternatively, the electronic device 102 may include one or more of the structures described in connection with one or more of FIGS. 2-10.

It should be noted that one or more of the elements or components of the electronic device 102 may be combined and/or divided. For example, the vibration noise reducer 112 and/or the response matcher 108 may be combined. Additionally or alternatively, one or more of the vibration noise reducer 112 and/or the response matcher 108 may be divided into elements or components that perform a subset of the operations thereof.

Figure 2:
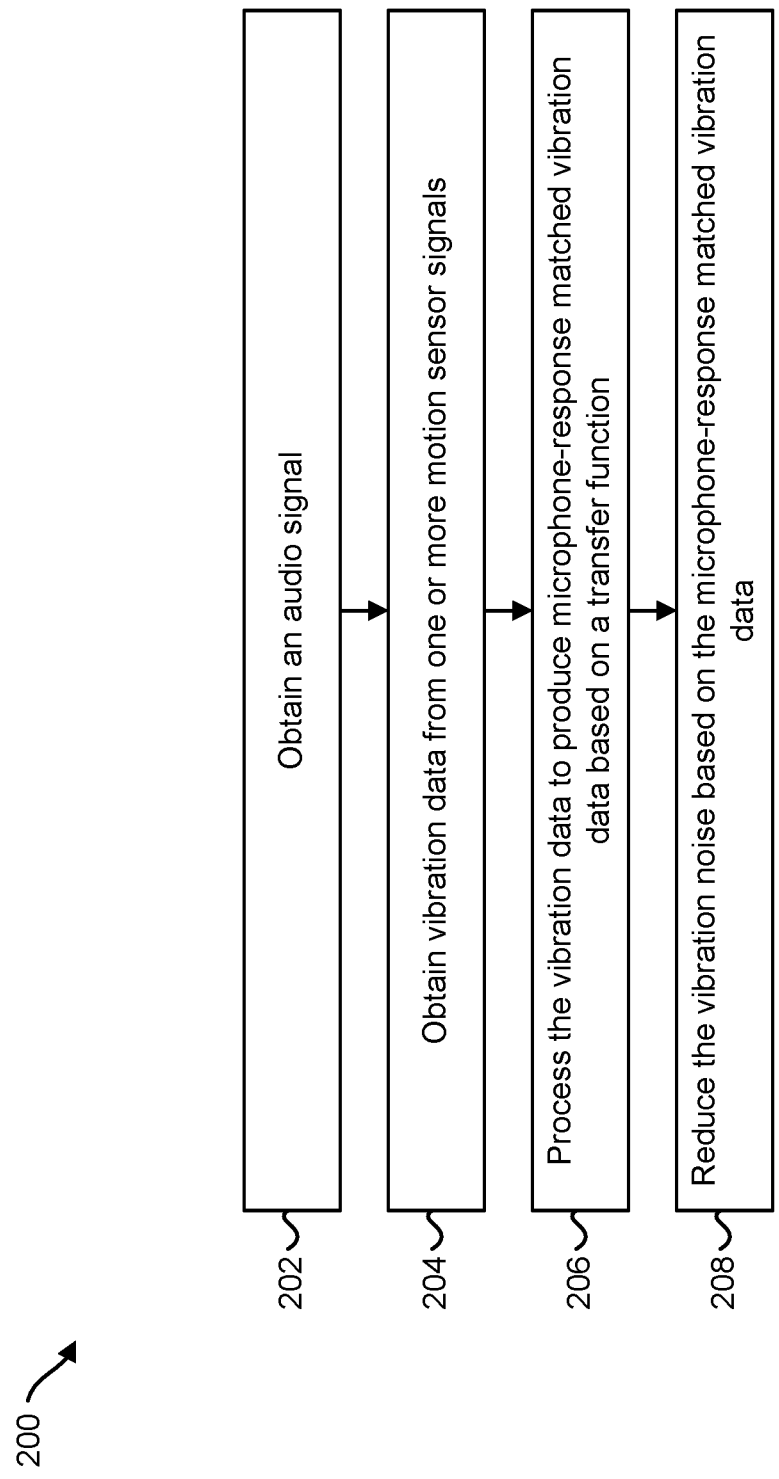
FIG. 2 is a flow diagram illustrating one configuration of a method for reducing vibration noise.

FIG. 2 is a flow diagram illustrating one configuration of a method 200 for reducing vibration noise. The method 200 may be performed by one or more of the electronic devices described herein (e.g., the electronic device 102 described in connection with FIG. 1, the electronic device 302 described in connection with FIG. 3, one or more of the components described in connection with FIG. 5, etc.). The electronic device 102 may obtain 202 one or more audio signals. This may be accomplished as described in connection with FIG. 1. For example, the electronic device 102 may capture the audio signal(s) using one or more integrated microphones and/or may receive the audio signal(s) from a remote device.

The electronic device 102 may obtain 204 vibration data from one or more motion sensor signals. This may be accomplished as described in connection with FIG. 1. For example, the electronic device 102 may sense the vibration data using an integrated motion sensor and/or may receive vibration data from a remote device.

The electronic device 102 may process 206 the vibration data to produce microphone-response matched vibration data based on a transfer function. This may be accomplished as described in connection with FIG. 1. For example, the electronic device 102 may apply a transfer function (e.g., filter, scaling, phase adjustment, etc.) to produce the microphone-response matched vibration data.

The electronic device 102 may reduce 208 the vibration noise based on the microphone-response matched vibration data. This may be accomplished as described in connection with FIG. 1. For example, the electronic device 102 may subtract the microphone-response matched vibration data from the one or more audio signals and/or may filter the one or more audio signals based on the microphone-response matched vibration data. This may produce one or more vibration noise reduced audio signals.

Figure 3:
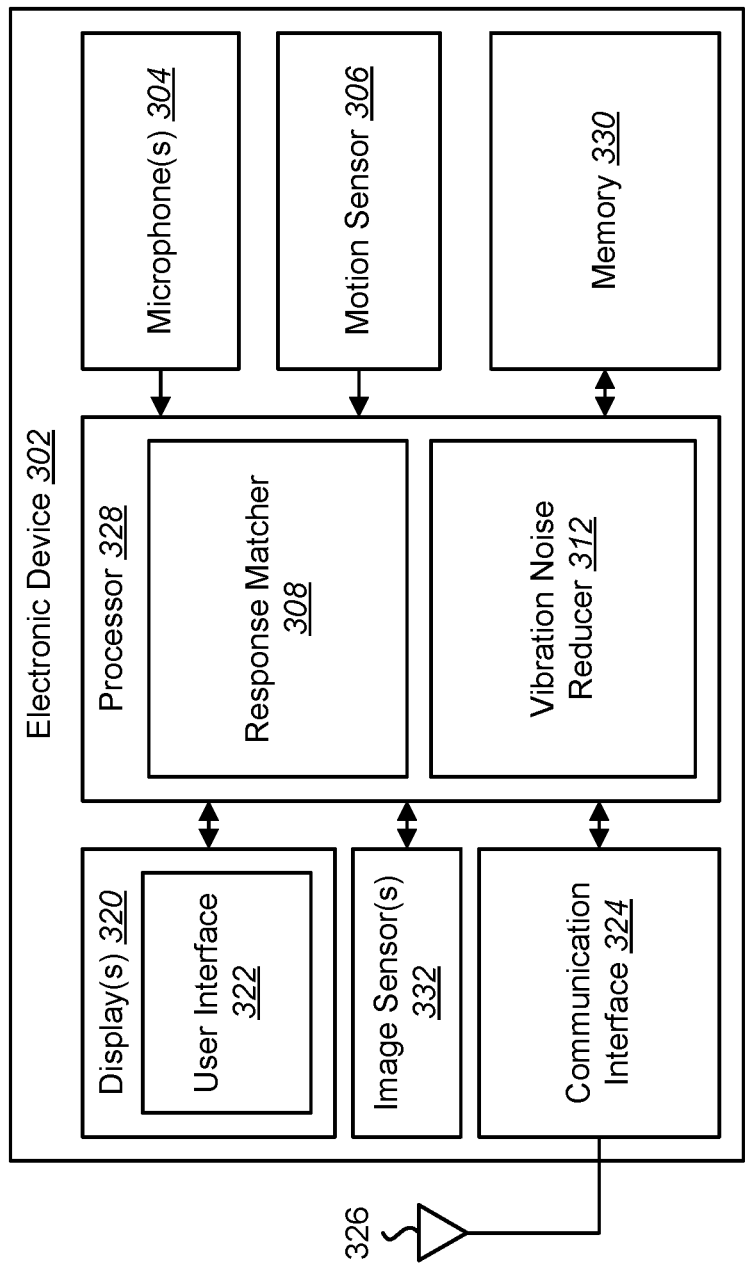
FIG. 3 is a block diagram illustrating one example of an electronic device in which systems and methods for reducing vibration noise may be implemented.

FIG. 3 is a block diagram illustrating one example of an electronic device 302 in which systems and methods for reducing vibration noise may be implemented. The electronic device 302 described in connection with FIG. 3 may be one example of the electronic device 102 described in connection with FIG. 1. Examples of the electronic device 302 include computers (e.g., desktop computers, laptop computers, etc.), cellular phones, smartphones, tablet devices, media players, televisions, vehicles, cameras, virtual reality devices (e.g., headsets), augmented reality devices (e.g., headsets), mixed reality devices (e.g., headsets), gaming consoles, personal digital assistants (PDAs), set-top boxes, appliances, etc. The electronic device 302 may include one or more components or elements. One or more of the components or elements may be implemented in hardware (e.g., circuitry) or a combination of hardware and software and/or firmware (e.g., a processor with instructions).

In some configurations, the electronic device 302 may include a processor 328, a memory 330, one or more displays 320, a communication interface 324, one or more image sensors 332, one or more microphones 304, and/or a motion sensor 306. The microphone(s) 304 and/or the motion sensor 306 may be examples of corresponding elements described in connection with FIG. 1. The processor 328 may be coupled to (e.g., in electronic communication with) the memory 330, one or more displays 320, a communication interface 324, one or more image sensors 332, one or more microphones 304, and/or a motion sensor 306. The processor 328 may be a general-purpose single- or multi-chip microprocessor (e.g., an advanced reduced instruction set computing machine (ARM)), a special-purpose microprocessor (e.g., a digital signal processor (DSP), a graphics processing unit (GPU), an audio coder/decoder (codec), etc.), a microcontroller, a programmable gate array, etc. The processor 328 may be referred to as a central processing unit (CPU). Although just a single processor 328 is shown in the electronic device 302, in an alternative configuration, a combination of processors (e.g., an ARM and a DSP, a codec and an application processor, etc.) may be used. The processor 328 may be configured to implement one or more of the methods disclosed herein.

The memory 330 may store instructions for performing operations by the processor 328. The memory 330 may be any electronic component capable of storing electronic information. The memory 330 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

Data and/or instructions may be stored in the memory 330. The instructions may be executable by the processor 328 to implement one or more of the methods described herein. Executing the instructions may involve the use of the data that is stored in the memory 330. When the processor 328 executes the instructions, various portions of the instructions may be loaded onto the processor 328, and various pieces of data may be loaded onto the processor 328.

The processor 328 may access (e.g., read from and/or write to) the memory 330. Examples of instructions and/or data that may be stored by the memory 330 may include response matcher 308 instructions and/or vibration noise reducer 312 instructions, etc.

In some configurations, the electronic device 302 may present a user interface 322 on the display 320. For example, the user interface 322 may enable a user to interact with the electronic device 302. For example, the user interface 322 may receive a touch, a mouse click, a gesture and/or some other input indicating a command or request (e.g., a calibration command for the response matcher 308, a vibration noise reduction command for the vibration noise reducer 312, etc.).

The display(s) 320 may be integrated into the electronic device 302 and/or may be coupled to the electronic device 302. For example, the electronic device 302 may be a smartphone with an integrated display. In another example, the electronic device 302 may be coupled to one or more remote displays 320 and/or to one or more remote devices that include one or more displays 320.

The image sensor(s) 332 may capture one or more images (e.g., still images, video, etc.). In some configurations, the images captured by the image sensor(s) 332 may be stored and/or encoded with one or more audio signals (e.g., vibration noise reduced audio signal(s)) captured by the microphone(s) 304.

The communication interface 324 may enable the electronic device 302 to communicate with one or more other electronic devices. For example, the communication interface 324 may provide an interface for wired and/or wireless communications. In some configurations, the communication interface 324 may be coupled to one or more antennas 326 for transmitting and/or receiving radio frequency (RF) signals. Additionally or alternatively, the communication interface 324 may enable one or more kinds of wireline (e.g., Universal Serial Bus (USB), Ethernet, etc.) communication. The communication interface 324 may be linked to one or more electronic devices (e.g., routers, modems, switches, servers, etc.). For example, the communication interface 324 may enable network (e.g., personal area network (PAN), local area network (LAN), metropolitan area network (MAN), wide area network (WAN), Internet, and/or public switched telephone network (PSTN), etc.) communications.

In some configurations, multiple communication interfaces 324 may be implemented and/or utilized. For example, one communication interface 324 may be a cellular (e.g., 3G, Long Term Evolution (LTE), CDMA2000, etc.) communication interface 324, another communication interface 324 may be an Ethernet interface, another communication interface 324 may be a universal serial bus (USB) interface, and yet another communication interface 324 may be a wireless local area network (WLAN) interface (e.g., Institute of Electrical and Electronics Engineers (IEEE) 802.11 interface). In some configurations, the communication interface 324 may send information (e.g., webpage requests, upload data, etc.) to and/or receive information from another device (e.g., another electronic device, a computer, a remote server, a remote microphone, a microphone array, etc.). The communication interface 324 may utilize one or more protocols (e.g., transmission control protocol (TCP), Internet protocol (IPv4, IPv6, etc.), hypertext transfer protocol (HTTP), etc.) for communication.

In some configurations, the electronic device 302 may perform one or more of the functions, procedures, methods, steps, etc., described in connection with one or more of FIGS. 1-10. Additionally or alternatively, the electronic device 302 may include one or more of the structures described in connection with one or more of FIGS. 1-10.

The processor 328 may include and/or implement a response matcher 308. The response matcher 308 may be a set of instructions, a routine, an application, etc., that enables matching the mechanical vibration response of the motion sensor 306 to the mechanical vibration response of the microphone(s) 304. The response matcher 308 may perform response matching as described in connection with one or more of FIGS. 1-2. For example, the response matcher 308 may implement a transfer function. For instance, the response matcher 308 may process vibration data from the motion sensor 306 (or a remote device) to produce microphone-response matched vibration data based on a transfer function. The response matcher 308 may be an example of the response matcher 108 described in connection with FIG. 1. The response matcher 308 may be calibrated as described herein in some configurations. In some approaches, the response matcher 308 may receive calibration data (e.g., a transfer function) from a remote device.

The processor 328 may include and/or implement a vibration noise reducer 312. The vibration noise reducer 312 may reduce the vibration noise in the audio signal(s) provided by the microphone(s) 304 (or a remote device). The vibration noise reducer 312 may perform vibration noise reduction as described in connection with one or more of FIGS. 1-2. The vibration noise reducer 312 may be an example of the vibration noise reducer 112 described in connection with FIG. 1. For instance, the vibration noise reducer 312 may produce one or more vibration noise reduced audio signals 118 based on the audio signal(s) and the microphone-response matched vibration data produced by the response matcher 308.

In some configurations, the vibration noise reduced audio signal(s) may be stored in memory 330, may be transmitted (using the communication interface 324, for example), and/or may be output. For example, the electronic device 302 may include one or more speakers that may be utilized to output the vibration noise reduced audio signal(s).

In some configurations, the processor 328 may add all or a portion of the vibration noise back into the vibration noise reduced audio signal(s). For example, the user interface 322 may receive an input indicating a command to add all or a portion of the vibration noise (e.g., removed vibration noise) back into the vibration noise reduced audio signal(s). For instance, a user may desire to keep all or a portion of vibration noise due to shock and/or vibration on the microphones for effect. Accordingly, some configurations of the systems and methods disclosed herein may enable a user to tune audio (e.g., audio accompanying visual data, a video) to mix an acoustic signal with all or a portion of vibration noise to achieve a desired acoustical level and a desired vibration noise level. In some configurations, the user interface 322 may receive an indication of a portion (e.g., a percentage) of vibration noise to be added back to the vibration noise reduced audio signal(s). The vibration noise (e.g., the microphone-response matched vibration data) may be scaled in accordance with the portion indicated.

It should be noted that one or more of the elements or components of the electronic device 302 may be combined and/or divided. For example, the response matcher 308 and/or the vibration noise reducer 312 may be combined. Additionally or alternatively, one or more of the response matcher 308 and/or the vibration noise reducer 312 may be divided into elements or components that perform a subset of the operations thereof.

Figure 4:
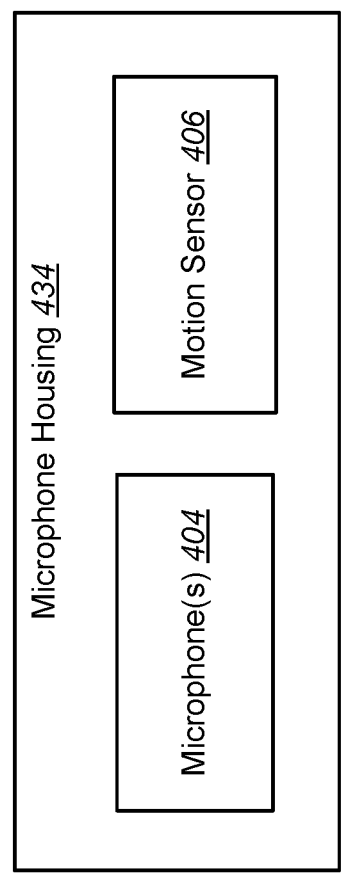
FIG. 4 is a diagram illustrating one example of a microphone housing.

FIG. 4 is a diagram illustrating one example of a microphone housing 434. The microphone housing 434 may include one or more microphones 404 and a motion sensor 406. The microphone(s) 404 and/or the motion sensor 406 may be examples of corresponding elements described in connection with one or more of FIGS. 1-3. The microphone housing 434 may provide a mechanical coupling between the microphone(s) 404 and the motion sensor 406. Accordingly, when the microphone(s) 404 experience movement (e.g., vibration, shock, etc.), the motion sensor 406 may experience similar movement. In some configurations, the microphone housing 434 may be the housing for an electronic device (e.g., electronic device 102, 302, etc.). In some configurations, the microphone housing 434 may be separate from and/or may be coupled to another electronic device (e.g., electronic device 102, 302, etc.).

Figure 5:
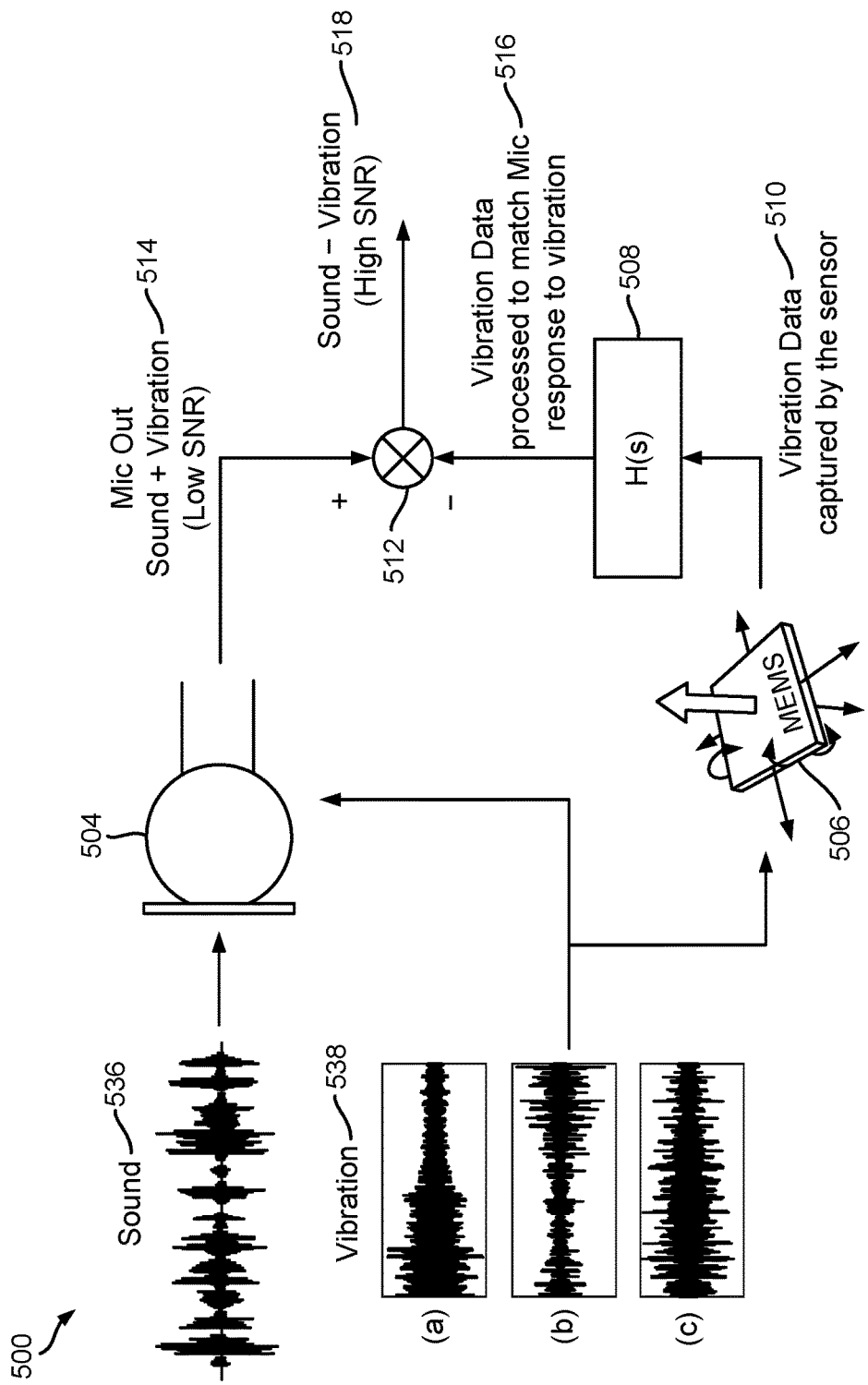
FIG. 5 is a circuit diagram illustrating one example of circuitry that may be implemented to reduce vibration noise.

FIG. 5 is a circuit diagram illustrating one example of circuitry 500 that may be implemented to reduce vibration noise. The circuitry 500 may be implemented in one or more of the electronic devices (e.g., electronic device 102, 302, etc.) described herein in some configurations. One or more of the elements described in connection with FIG. 5 may be examples of one or more corresponding elements described in connection with one or more other Figures.

The circuitry 500 may include a microphone 504 that captures sound 536. For example, the microphone 504 may capture acoustic sound 536 and may convert the acoustic sound 536 to an electronic signal.

As illustrated in FIG. 5, the microphone 504 may also experience and/or capture vibration 538. Accordingly, the microphone output signal 514 may include both vibration noise and sound components. The microphone output signal 514 may be provided to a summer 512. The summer 512 may be one example of the vibration noise reducer(s) 112, 312 described in connection with one or more of FIGS. 1 and 3.

The circuitry 500 may also include a motion sensor 506. In this example, the motion sensor 506 is a 6-axis MEMS motion sensor, which may capture 3-axis translational motion and 3-axis rotational motion. The 6-axis motion signals may be provided by the motion sensor 506 as vibration data 510 to a transfer function 508 (e.g., H(s)). The transfer function 508 may be applied to the vibration data 510 to produce microphone-response matched vibration data 516. The microphone-response matched vibration data 516 may be provided to the summer 512.

The summer 512 may subtract the microphone-response matched vibration data 516 from the microphone output signal 514 (e.g., sound+vibration noise). The summer 512 may reduce (e.g., remove) the vibration noise from the microphone output signal 514 to produce a sound signal 518 (without vibration noise, or with reduced vibration noise). The resulting sound signal 518 may have a high SNR.

Figure 6:
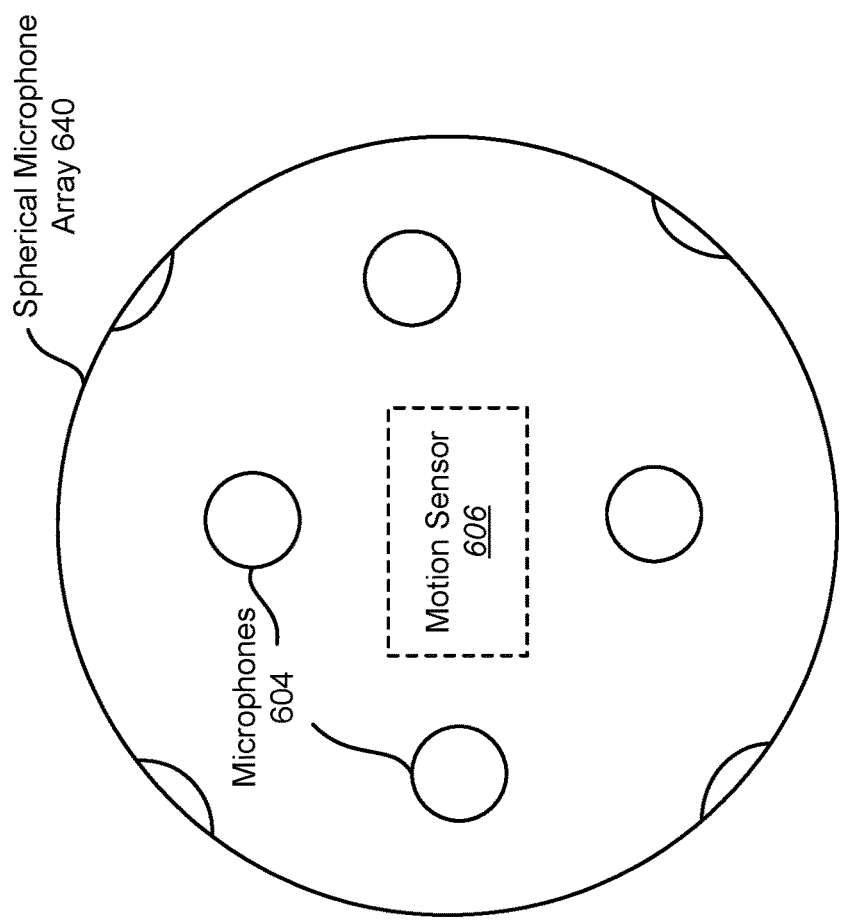
FIG. 6 is a diagram illustrating one example of a spherical microphone array.

FIG. 6 is a diagram illustrating one example of a spherical microphone array 640. The spherical microphone array 640 may include one or more microphones 604. The one or more microphones 604 may be examples of the one or more microphones described in connection with one or more of FIGS. 1-5.

The spherical microphone array 640 may include a motion sensor 606. For example, the motion sensor 606 may be mounted within the spherical microphone array 640. This may allow the motion sensor 606 to detect vibration data. The vibration data may be utilized to reduce vibration noise for all of the audio signals captured by the microphones 604 as described herein.

Figure 7:
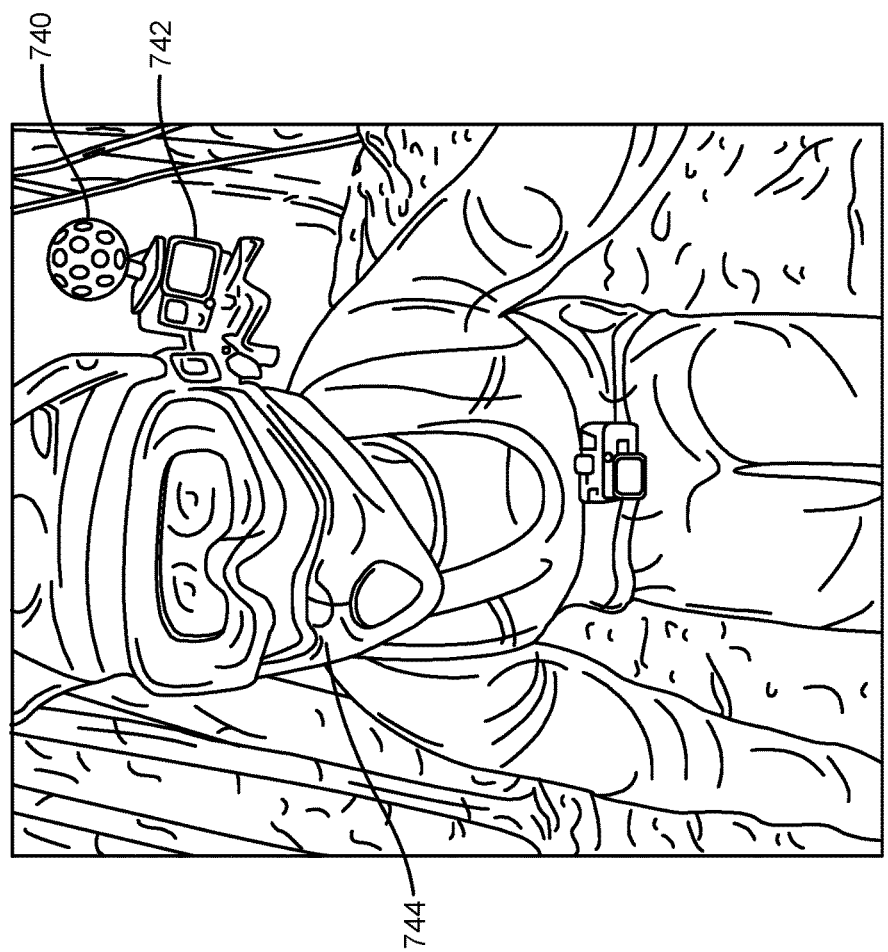
FIG. 7 illustrates one example of a use case of the systems and methods disclosed herein.

FIG. 7 illustrates one example of a use case of the systems and methods disclosed herein. In particular, FIG. 7 illustrates an electronic device 742 (e.g., an action camera) with a spherical microphone array 740 mounted thereon. In this example, the electronic device 742 is mounted to the helmet 744 of a mountain biker.

While the mountain biker is in motion, the microphone array 740 may be subjected to significant vibration noise. In accordance with the systems and methods disclosed herein, a motion sensor may be mounted in the microphone array (as described in connection with FIG. 6). Using the audio signals captured by the microphone array 740 and the vibration data captured by the motion sensor, the electronic device 742 may reduce or remove the vibration noise in the audio signals. This may enable improved audio quality in a recording produced by the electronic device 742.

Figure 8:
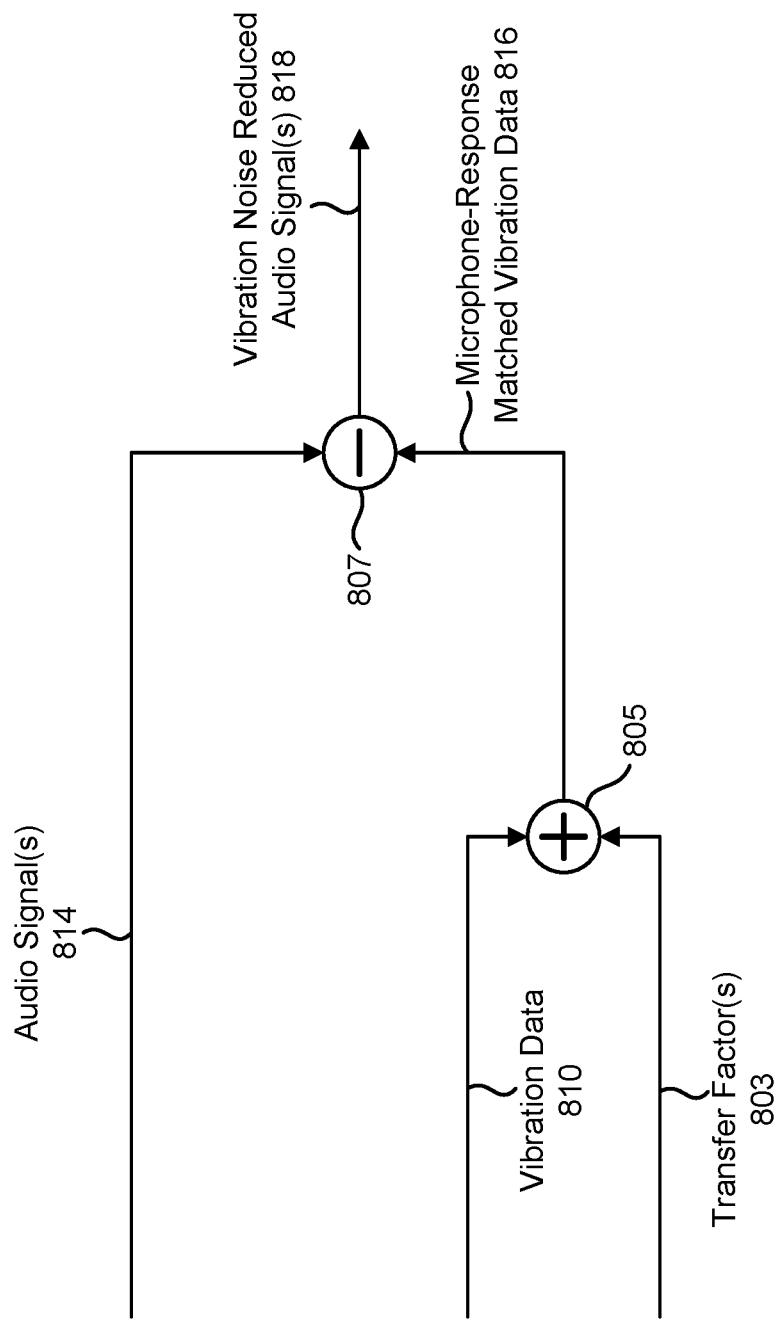
FIG. 8 is a block diagram illustrating an example of an approach for reducing vibration noise.

FIG. 8 is a block diagram illustrating an example of an approach for reducing vibration noise. In particular, FIG. 8 illustrates an example of signal processing that may be performed in accordance with some configurations of the systems and methods disclosed herein. In some configurations, the processing described in FIG. 8 may be performed per microphone (e.g., per audio signal obtained). For example, the procedure may be performed for a single microphone and may be duplicated for any number of microphones. Each microphone may be calibrated and/or the operation may be independent on each microphone. It should be noted that all microphones may utilize the same motion sensor in some configurations.

As described herein, an electronic device (e.g., the electronic device 102 described in connection with FIG. 1) may obtain one or more audio signals 814 from one or more microphones (e.g., one or more microphone output signals). The audio signal(s) 814 described in connection with FIG. 8 may be examples of the audio signal(s) 114 described in connection with FIG. 1. Each audio signal 814 may include (e.g., exhibit) an acoustic response (e.g., an electronic response to an acoustic sound signal) and a vibration response (e.g., vibration noise). A more specific example of an audio signal 814 (e.g., a total microphone response, MT) is given in connection with FIG. 11.

As described herein, an electronic device may obtain vibration data 810. The vibration data 810 described in connection with FIG. 8 may be one example of the vibration data 110 described in connection with FIG. 1. The vibration data 810 may include (e.g., exhibit) a motion sensor response (e.g., an accelerometer response). A more specific example of vibration data (e.g., motion sensor or accelerometer vibration response, $AV_{(x,y,z)}$) is given in connection with FIG. 12.

As described herein, an electronic device may process the vibration data 810 to produce microphone-response matched vibration data 816 based on a transfer function. The microphone-response matched vibration data 816 described in connection with FIG. 8 may be one example of the microphone-response matched vibration data 116 described in connection with FIG. 1. In the example illustrated in FIG. 8, the transfer function may be represented by (e.g., may include) one or more transfer factors 803. A more specific example of a transfer factor (e.g., transfer factor $K_{(x,y,z)}$ in three dimensions) is given in connection with FIG. 13. Each transfer factor may be calculated (during calibration, for example) based on a microphone position relative to a motion sensor (e.g., accelerometer) position.

In the example illustrated in FIG. 8, the transfer factor(s) 803 may be added to the vibration data 810 with a summer 805 to produce a microphone vibration response (e.g., $MV_{(x,y,z)}$). For example, an accelerometer response may be added to a transfer factor to produce the microphone vibration response. In some configurations, vibration levels from each axis of the microphone vibration response (e.g., $MV_{(x,y,z)}$) may be summed (e.g., x+y+z) to produce microphone-response matched vibration data 816 (e.g., a total microphone vibration response $MV_t$). A more specific example of microphone-response matched vibration data 816 is given in connection with FIG. 14.

As described herein, an electronic device may reduce the vibration noise based on the microphone-response matched vibration data 816. In the example illustrated in FIG. 8, the microphone-response matched vibration data 816 (e.g., $MV_t$) may be subtracted from the audio signal(s) (e.g., a total microphone response, MT) with a subtractor 807 to produce one or more vibration noise reduced audio signals 818 (e.g., a microphone acoustic response, MA). The subtractor 807 may be one example of a vibration noise reducer 112 described in connection with FIG. 1. A more specific example of a vibration noise reduced audio signal 818 (e.g., a clean acoustic output, a processed output, a restored acoustic response, MA) is given in connection with FIG. 15.

The vibration noise reduced audio signal 818 may approximate an original acoustic response of the corresponding microphone.

Figure 9:
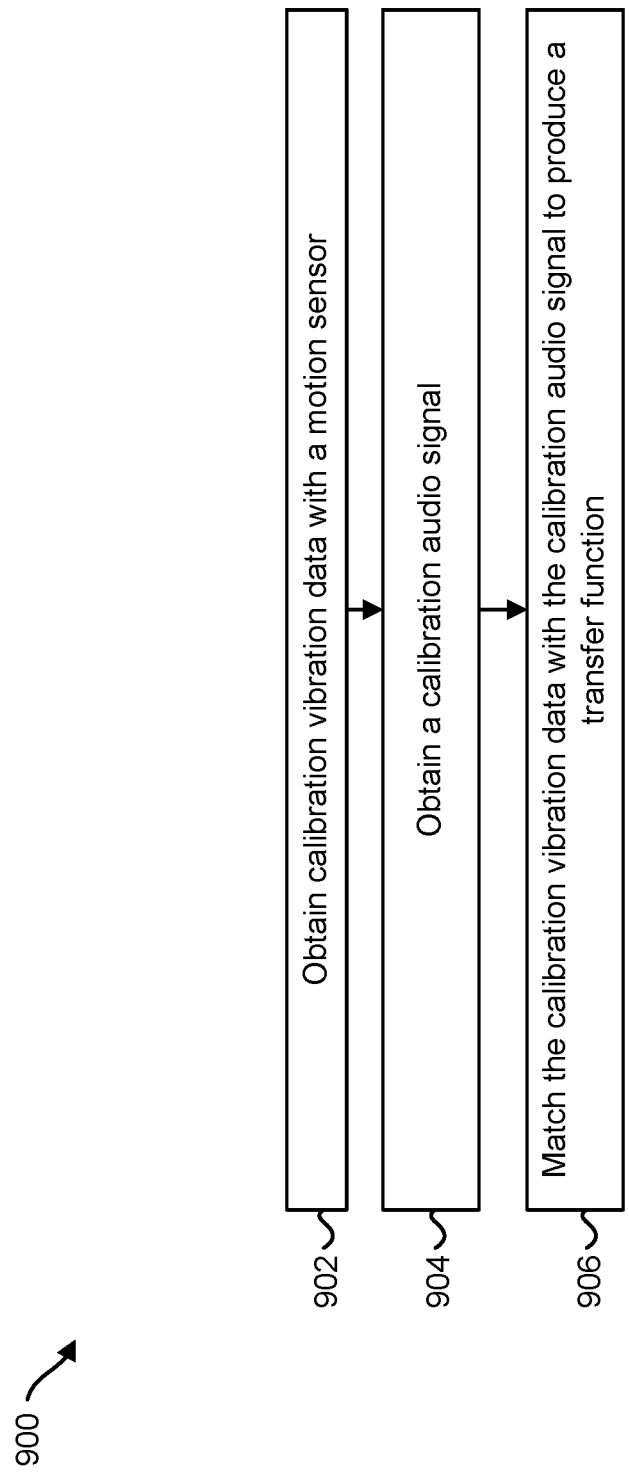
FIG. 9 is a flow diagram illustrating one configuration of a method for calibrating an electronic device.

FIG. 9 is a flow diagram illustrating one configuration of a method 900 for calibrating an electronic device. One or more of the electronic devices (e.g., electronic device(s) 102, 302), components (e.g., components described in connection with FIG. 5), and/or another device may perform the method 900. Calibrating the electronic device may be performed offline (e.g., before runtime) and/or may be performed on demand (e.g., when the electronic device receives a command to calibrate).

The motion sensor and/or one or more microphones may be subjected to vibration. Calibration vibration data may be obtained 902 with the motion sensor. For example, calibration vibration data may be obtained from the motion sensor (for one or more axes, for instance) while the motion sensor is being subjected to vibration.

One or more calibration audio signals may be obtained 904. For example, one or more calibration audio signals may be obtained and/or received from one or more microphones while the microphones are being subjected to vibration.

The calibration vibration data may be matched 906 with the calibration audio signal(s) to produce a transfer function. In some configurations, the calibration vibration data and the calibration audio signal(s) may be transformed into the frequency domain. The transfer function may then be calculated with the transformed calibration vibration data and the calibration audio signal(s). In some approaches, a transformed audio signal A(s), the transfer function H(s) and the calibration vibration data V(s) may be represented as given in the following equation: A(s)=H(s)V(s). Accordingly, the transfer function H(s) may be calculated in accordance with the following equation: H(s)=A(s)/V(s). The transfer function H(s) may be utilized at runtime as described herein. For example, reducing vibration noise may be performed in accordance with the following equation: $A_r(s)-V_r(s)H(s)=A_{nr}(s)$, where $A_r(s)$ is a runtime audio signal in the frequency domain, $V_r(s)$ is runtime vibration data in the frequency domain, and $A_{nr}(s)$ is a vibration noise reduced audio signal in the frequency domain.

Additionally or alternatively, the calibration data may be matched 906 with the calibration audio signal(s) to produce a transfer function as follows. The transfer function (e.g., one or more transfer factors) may be determined by subtracting the calibration vibration data (e.g., a motion sensor vibration response, accelerometer vibration response, $AV_{(x,y,z)}$, etc.) from the calibration audio signal (e.g., microphone vibration response, $MV_{(x,y,z)}$, etc.) as described in connection with Equation (2).

Figure 10:
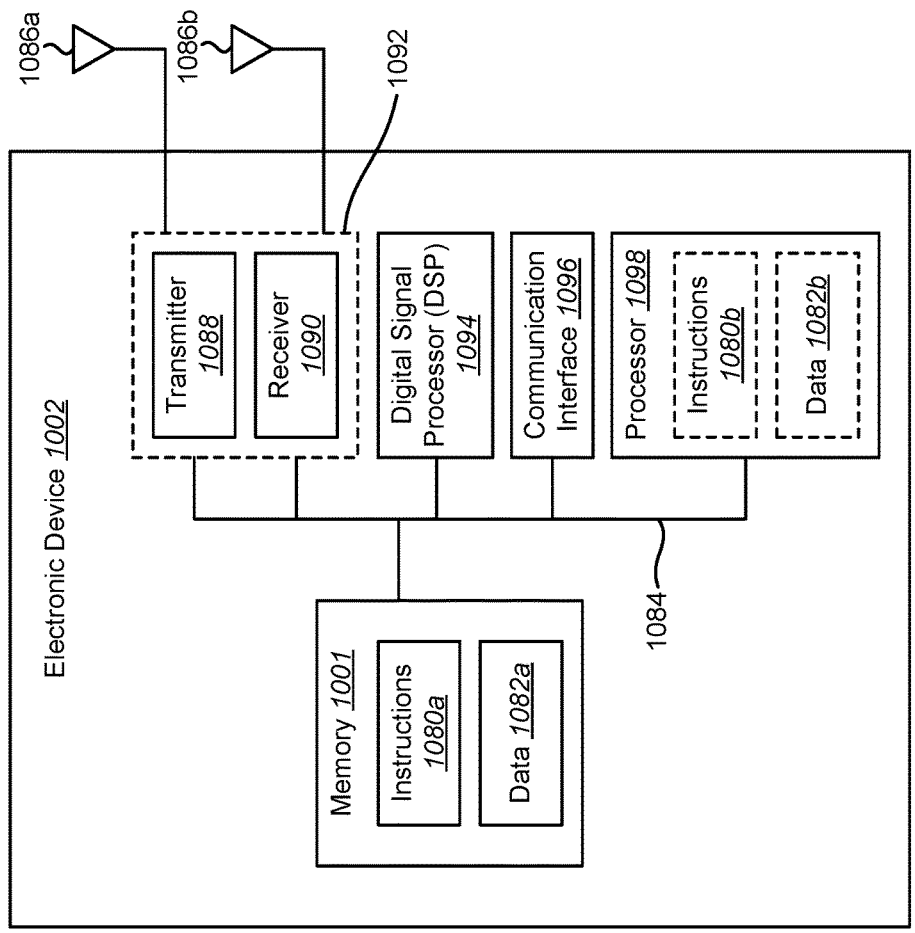
FIG. 10 illustrates certain components that may be included within an electronic device configured to implement various configurations of the systems and methods disclosed herein.

FIG. 10 illustrates certain components that may be included within an electronic device 1002 configured to implement various configurations of the systems and methods disclosed herein. Examples of the electronic device 1002 may include cellular phones, smart phones, computers (e.g., desktop computers, laptop computers, etc.), tablet devices, media players, televisions, vehicles, automobiles, cameras, virtual reality devices (e.g., headsets), augmented reality devices (e.g., headsets), mixed reality devices (e.g., headsets), aircraft, healthcare equipment, gaming consoles, personal digital assistants (PDAs), set-top boxes, appliances, etc. The electronic device 1002 may be implemented in accordance with one or more of the electronic devices 102, 302 described in connection with one or more of FIGS. 1 and 3 and/or in accordance with the circuitry 500 described in connection with FIG. 5.

The electronic device 1002 includes a processor 1098. The processor 1098 may be a general purpose single- or multi-chip microprocessor (e.g., an advanced reduced instruction set computing (RISC) machine (ARM)), a special purpose microprocessor (e.g., a digital signal processor (DSP), a graphics processing unit (GPU)), a microcontroller, a programmable gate array, etc. The processor 1098 may be referred to as a central processing unit (CPU). Although just a single processor 1098 is shown in the electronic device 1002, in an alternative configuration, a combination of processors (e.g., an ARM and DSP, an application processor and a GPU, etc.) could be implemented.

The electronic device 1002 also includes memory 1001. The memory 1001 may be any electronic component capable of storing electronic information. The memory 1001 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers, and so forth, including combinations thereof.

Data 1082a and instructions 1080a may be stored in the memory 1001. The instructions 1080a may be executable by the processor 1098 to implement one or more of the methods 200, 900, procedures, steps, and/or functions described herein. Executing the instructions 1080a may involve the use of the data 1082a that is stored in the memory 1001. When the processor 1098 executes the instructions 1080, various portions of the instructions 1080b may be loaded onto the processor 1098 and/or various pieces of data 1082b may be loaded onto the processor 1098.

The electronic device 1002 may also include a transmitter 1088 and a receiver 1090 to allow transmission and reception of signals to and from the electronic device 1002. The transmitter 1088 and receiver 1090 may be collectively referred to as a transceiver 1092. One or more antennas 1086a-b may be electrically coupled to the transceiver 1092. The electronic device 1002 may also include (not shown) multiple transmitters, multiple receivers, multiple transceivers and/or additional antennas.

The electronic device 1002 may include a digital signal processor (DSP) 1094. The electronic device 1002 may also include a communication interface 1096. The communication interface 1096 may allow and/or enable one or more kinds of input and/or output. For example, the communication interface 1096 may include one or more ports and/or communication devices for linking other devices to the electronic device 1002. In some configurations, the communication interface 1096 may include the transmitter 1088, the receiver 1090, or both (e.g., the transceiver 1092). Additionally or alternatively, the communication interface 1096 may include one or more other interfaces (e.g., touchscreen, keypad, keyboard, microphone, camera, etc.). For example, the communication interface 1096 may enable a user to interact with the electronic device 1002.

The various components of the electronic device 1002 may be coupled together by one or more buses, which may include a power bus, a control signal bus, a status signal bus, a data bus, etc. For the sake of clarity, the various buses are illustrated in FIG. 10 as a bus system 1084.

Figure 11:
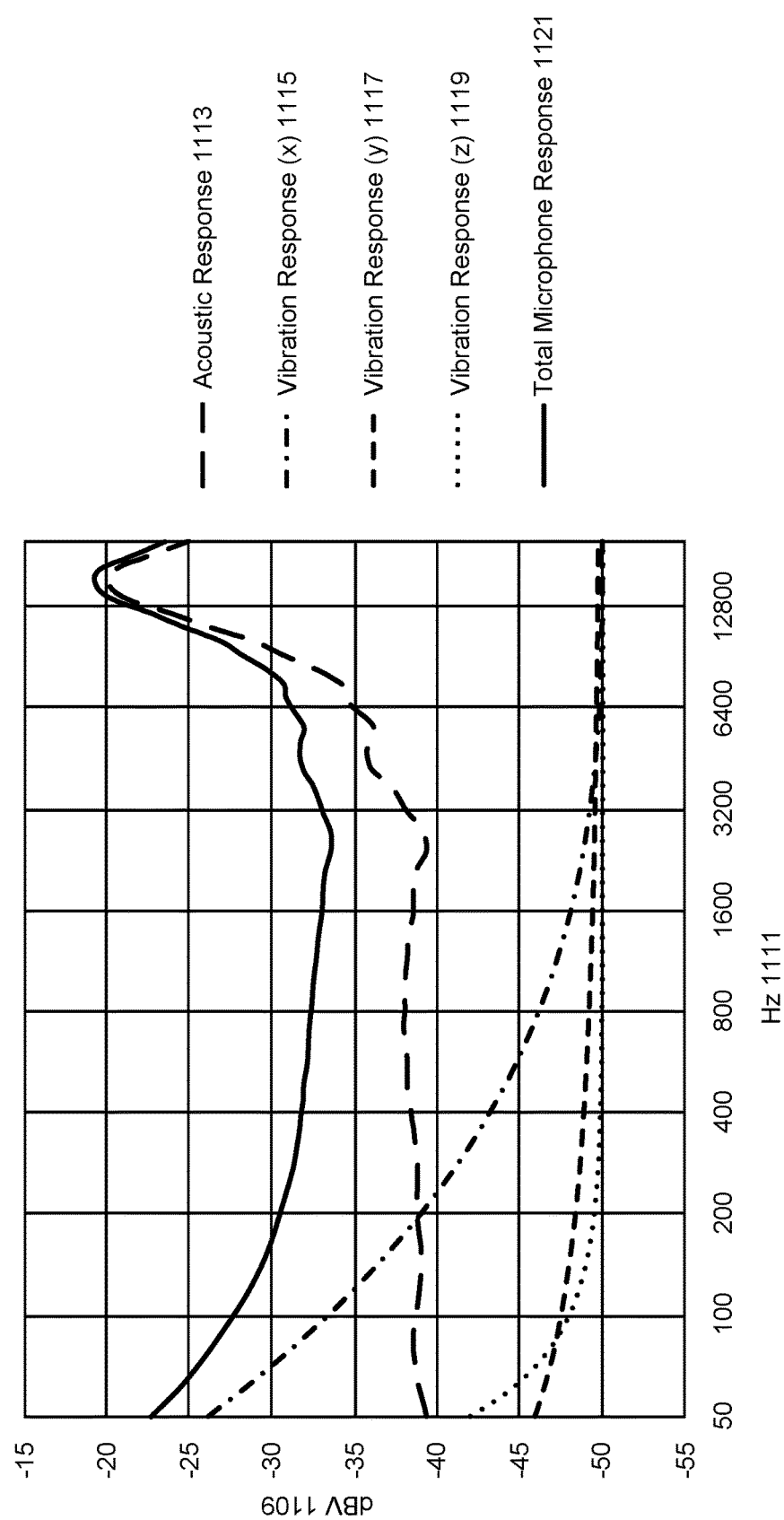
FIG. 11 is a graph illustrating an example of a total microphone response.

FIG. 11 is a graph illustrating an example of a total microphone response 1121. The graph is illustrated in decibels relative to 1 volt (dBV) 1109 over hertz (Hz) 1111. As illustrated in FIG. 11, the total microphone response 1121 may include an acoustic response 1113 (e.g., a response to sound) and a microphone vibration response in three dimensions. Specifically, the microphone vibration response may include an x component vibration response 1115, a y component vibration response 1117, and a z component vibration response 1119. The total microphone response 1121 may be an example of an audio signal (e.g., an audio signal 114 described in connection with FIG. 1, a microphone output 514 described in connection with FIG. 5, an audio signal 814 described in connection with FIG. 8, etc.).

Figure 12:
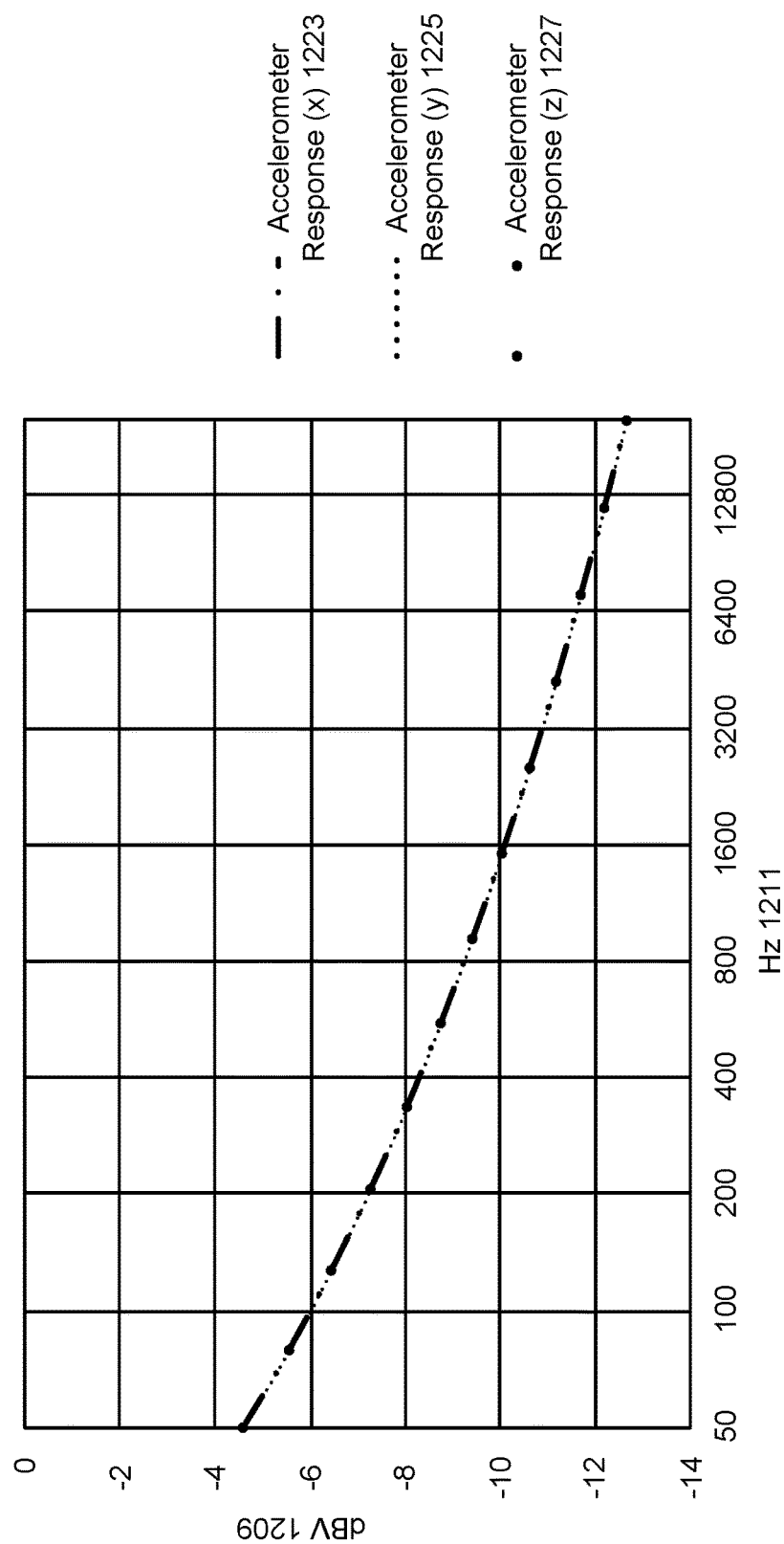
FIG. 12 is a graph illustrating an example of a motion sensor response.

FIG. 12 is a graph illustrating an example of a motion sensor response (e.g., accelerometer response). The graph is illustrated in decibels relative to 1 volt (dBV) 1209 over hertz (Hz) 1211. As illustrated in FIG. 12, the accelerometer response may include three dimensions. Specifically, the accelerometer response may include an x component accelerometer response 1223, a y component accelerometer response 1225, and a z component accelerometer response 1227. The accelerometer response may be an example of vibration data (e.g., the vibration data 110 described in connection with FIG. 1, the vibration data 510 described in connection with FIG. 5, the vibration data 810 described in connection with FIG. 8, etc.).

Figure 13:
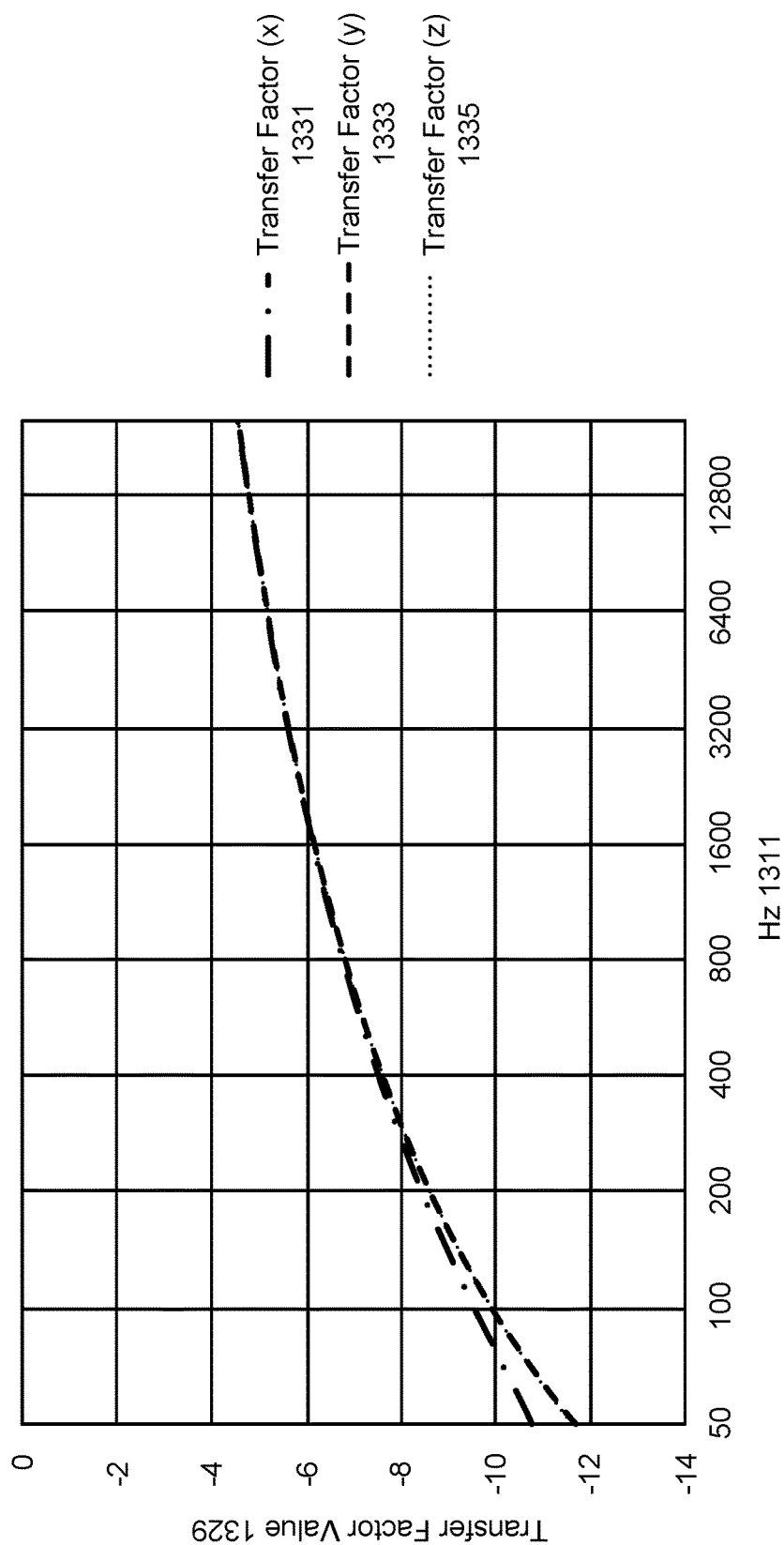
FIG. 13 is a graph illustrating an example of a transfer factor.

FIG. 13 is a graph illustrating an example of a transfer factor. The graph is illustrated in transfer factor value 1329 over hertz (Hz) 1311. As illustrated in FIG. 13, the transfer factor may include three dimensions. Specifically, the transfer factor may include an x component transfer factor 1331, a y component transfer factor 1333, and a z component transfer factor 1335. The transfer factor may be an example of a transfer function or a portion of a transfer function (e.g., the transfer function and/or transfer factor described in connection with FIG. 1, the H(s) described in connection with FIG. 5, a transfer factor 803 described in connection with FIG. 8, etc.). As described herein, the transfer factor 803 (e.g., K) may be determined during calibration by subtracting a motion sensor vibration response from a microphone vibration response.

Figure 14:
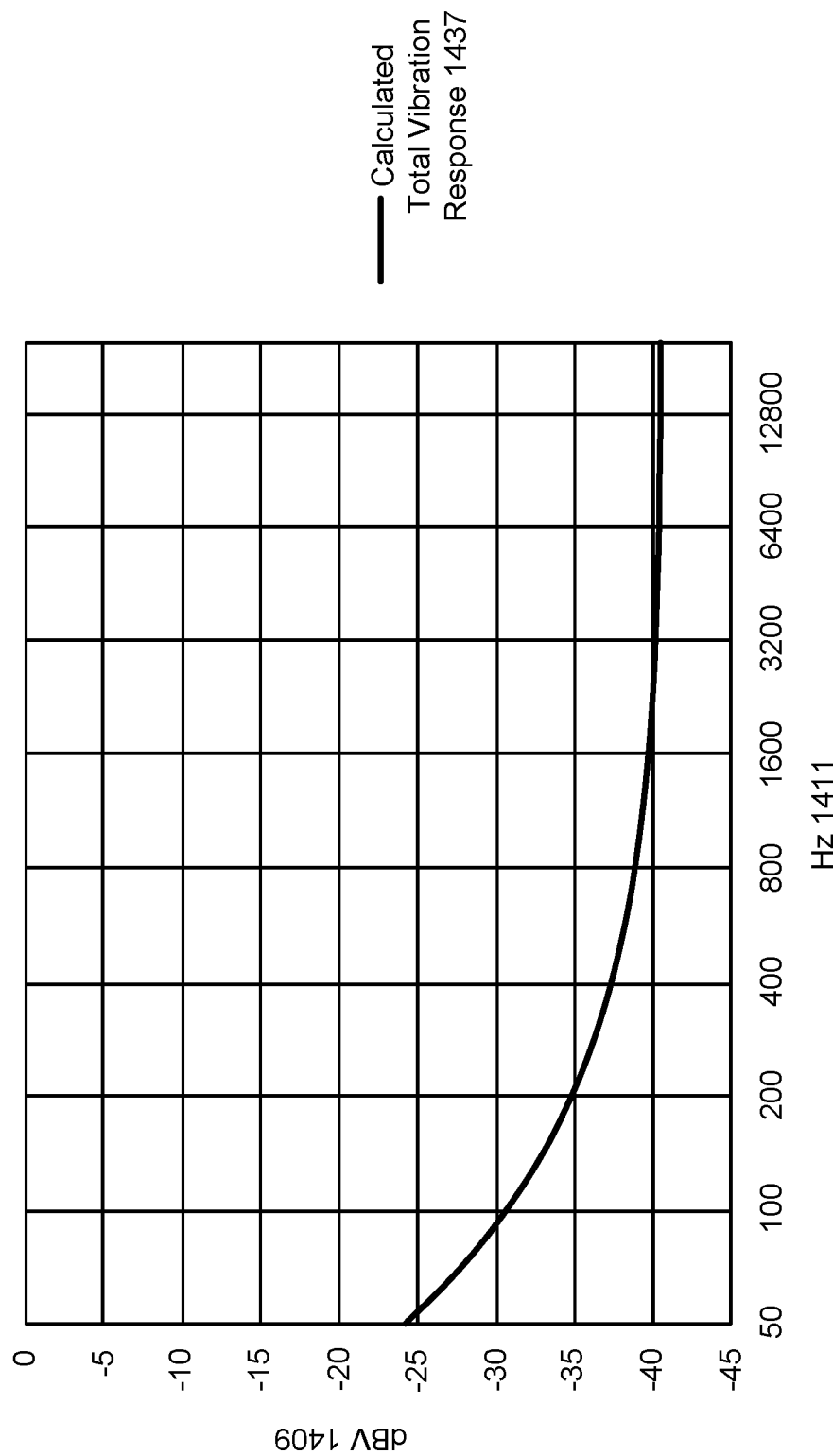
FIG. 14 is a graph illustrating an example of a calculated total vibration response.

FIG. 14 is a graph illustrating an example of a calculated total vibration response 1437. The graph is illustrated in decibels relative to 1 volt (dBV) 1409 over hertz (Hz) 1411. The calculated total vibration response 1437 may be a sum of the motion sensor response and the transfer factor. The accelerometer response may be an example of microphone-response matched vibration data (e.g., the microphone-response matched vibration data 116 described in connection with FIG. 1, the vibration data 516 described in connection with FIG. 5, the microphone-response matched vibration data 816 described in connection with FIG. 8, etc.).

FIG. 15 is a graph illustrating an example of a restored acoustic response 1539. The graph is illustrated in decibels relative to 1 volt (dBV) 1509 over hertz (Hz) 1511. The restored acoustic response 1539 may be a difference of the microphone-response matched vibration data (e.g., the total vibration response) and the audio signal (e.g., the total microphone response). The restored acoustic response 1539 may be an example of a vibration noise reduced audio signal (e.g., a vibration noise reduced audio signal 118 described in connection with FIG. 1, the sound signal 518 described in connection with FIG. 5, a vibration noise reduced audio signal 818 described in connection with FIG. 8, etc.).

The term "determining" encompasses a wide variety of actions and, therefore, "determining" can include calculating, computing, processing, deriving, investigating, looking up (e.g., looking up in a table, a database or another data structure), ascertaining, and the like. Also, "determining" can include receiving (e.g., receiving information), accessing (e.g., accessing data in a memory), and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, compact disc read-only memory (CD-ROM) or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk, and Blu-Ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed, or computed by the computing device or processor. As used herein, the term "code" may refer to software, instructions, code, or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes, and variations may be made in the arrangement, operation, and details of the systems, methods, and apparatus described herein without departing from the scope of the claims.

What is claimed is:

1. A method for reducing vibration noise by an electronic device, comprising:
    obtaining an audio signal, wherein the audio signal comprises vibration noise;
    obtaining vibration data from one or more motion sensor signals, wherein a 6-axis motion sensor that produces the one or more motion sensor signals is alignment independent from a microphone that produces the audio signal;
    processing the vibration data to produce microphone-response matched vibration data based on a transfer function, wherein processing the vibration data comprises adding vibration levels from a plurality of axes to produce a total microphone vibration response; and
    reducing the vibration noise based on the microphone-response matched vibration data.

2. The method of claim 1, wherein the transfer function indicates a mechanical vibration response relationship between the 6-axis motion sensor and the microphone.

3. The method of claim 1, wherein the vibration noise is reduced in an electronic domain.

4. The method of claim 1, wherein the 6-axis motion sensor that produces the one or more motion sensor signals is used for multiple microphones.

5. The method of claim 1, wherein the transfer function varies over frequency.

6. The method of claim 1, wherein the electronic device comprises a microphone array that includes the microphone.

7. The method of claim 6, wherein the microphone array is a spherical microphone array that is mechanically coupled to the 6-axis motion sensor that produces the one or more motion sensor signals.

8. The method of claim 1, wherein the transfer function is calibrated to match a motion sensor vibration response to a vibration response of the microphone.

9. The method of claim 1, further comprising adjusting a physical disposition of the microphone based on the vibration data.

10. An electronic device for reducing vibration noise, comprising:
a processor configured to:
obtain an audio signal, wherein the audio signal comprises vibration noise;
obtain vibration data from one or more motion sensor signals, wherein a 6-axis motion sensor configured to produce the one or more motion sensor signals is alignment independent from a microphone configured to produce the audio signal;
process the vibration data to produce microphone-response matched vibration data based on a transfer function, wherein the processor is configured to add vibration levels from a plurality of axes to produce a total microphone vibration response; and
reduce the vibration noise based on the microphone-response matched vibration data.

11. The electronic device of claim 10, wherein the transfer function indicates a mechanical vibration response relationship between the 6-axis motion sensor and the microphone.

12. The electronic device of claim 10, wherein the processor is configured to reduce the vibration noise in an electronic domain.

13. The electronic device of claim 10, wherein the 6-axis motion sensor configured to produce the one or more motion sensor signals is configured to be used for multiple microphones.

14. The electronic device of claim 10, wherein the transfer function varies over frequency.

15. The electronic device of claim 10, further comprising a microphone array that includes the microphone.

16. The electronic device of claim 15, wherein the microphone array is a spherical microphone array that is mechanically coupled to the 6-axis motion sensor configured to produce the one or more motion sensor signals.

17. The electronic device of claim 10, wherein the transfer function is configured to be calibrated to match a motion sensor vibration response to a vibration response of the microphone.

18. The electronic device of claim 10, wherein the processor is further configured to adjust a physical disposition of the microphone based on the vibration data.

19. An apparatus for reducing vibration noise, comprising:
means for obtaining an audio signal, wherein the audio signal comprises vibration noise;
means for obtaining vibration data from one or more motion signals, wherein a means for sensing 6-axis motion that produces the one or more motion signals is alignment independent from an audio sensing means that produces the audio signal;
means for processing the vibration data to produce audio sensing means-response matched vibration data based on a transfer function, wherein the means for processing the vibration data comprises means for adding vibration levels from a plurality of axes to produce a total microphone vibration response; and
means for reducing the vibration noise based on the audio sensing means-response matched vibration data.

20. The apparatus of claim 19, wherein the transfer function indicates a mechanical vibration response relationship between the means for sensing 6-axis motion and the audio sensing means.

21. The apparatus of claim 19, wherein the means for sensing 6-axis motion that produces the one or more motion signals is used for multiple audio sensing means.

22. The apparatus of claim 19, wherein the transfer function is calibrated to match a means for sensing motion vibration response to a vibration response of the audio sensing means.

23. A computer-program product for reducing vibration noise, comprising a non-transitory computer-readable medium having instructions thereon, the instructions comprising:
code for causing an electronic device to obtain an audio signal, wherein the audio signal comprises vibration noise;
code for causing the electronic device to obtain vibration data from one or more motion sensor signals, wherein a 6-axis motion sensor that produces the one or more motion sensor signals is alignment independent from a microphone that produces the audio signal;
code for causing the electronic device to process the vibration data to produce microphone-response matched vibration data based on a transfer function, comprising code for causing the electronic device to add vibration levels from a plurality of axes to produce a total microphone vibration response; and
code for causing the electronic device to reduce the vibration noise based on the microphone-response matched vibration data.

24. The computer-program product of claim 23, wherein the transfer function indicates a mechanical vibration response relationship between the 6-axis motion sensor and the microphone.

25. The computer-program product of claim 23, wherein the 6-axis motion sensor that produces the one or more motion sensor signals is used for multiple microphones.

26. The computer-program product of claim 23, wherein the transfer function is calibrated to match a motion sensor vibration response to a vibration response of the microphone.

* * * * *